United States Patent [19]

Ficker

[11] Patent Number: 5,167,830
[45] Date of Patent: Dec. 1, 1992

[54] DICYANADIAMIDE FORMALDEHYDE PAINT DETACKIFIER

[75] Inventor: Charles Ficker, Cincinnati, Ohio
[73] Assignee: Diversey Corporation, Canada
[21] Appl. No.: 670,051
[22] Filed: Mar. 15, 1991
[51] Int. Cl.$^5$ ............................................. C02F 1/56
[52] U.S. Cl. ................................. 210/712; 55/85; 210/725; 210/728; 210/735; 210/930
[58] Field of Search ............... 55/84, 85; 134/38; 210/712, 725, 727, 728, 735, 930

[56] References Cited

U.S. PATENT DOCUMENTS

| | | | |
|---|---|---|---|
| 3,498,913 | 3/1970 | Sellett | 210/735 |
| 3,515,575 | 6/1970 | Arnold | 55/84 |
| 3,716,483 | 2/1973 | Renner | 210/40 |
| 3,861,887 | 1/1975 | Forney | 55/19 |
| 4,055,495 | 10/1977 | Gabel et al. | 252/327 |
| 4,067,806 | 1/1978 | Mauceri | 55/89 |
| 4,401,574 | 8/1983 | Farrington et al. | 210/930 |
| 4,504,395 | 3/1985 | Harpel et al. | 210/712 |
| 4,629,572 | 12/1986 | Leitz et al. | 210/714 |
| 4,656,059 | 4/1987 | Mizuno et al. | 210/729 |
| 4,800,039 | 1/1989 | Hassick et al. | 210/728 |
| 4,913,825 | 4/1990 | Mitchell | 210/728 |

FOREIGN PATENT DOCUMENTS 59-69112  4/1984  Japan ................................ 210/728

Primary Examiner—Peter Hruskoci
Attorney, Agent, or Firm—Wood, Herron & Evans

[57] ABSTRACT

A paint detackification treatment for paint spray booths include a water soluble polymer which is a dicyanadiamide formaldehyde condensation product in combination with multivalent metal salt, preferably aluminum chlorohydrate. The composition is added to the overspray collection tanks and acts to detackify particles of paint which are collected in a water curtain. The combination of the dicyanadiamide formaldehyde and aluminum chlorohydrate permits a lower concentration of polymer to be used and also permits this detackification product to be used with a wide variety of aqueous and oil based paints.

9 Claims, No Drawings

DICYANADIAMIDE FORMALDEHYDE PAINT DETACKIFIER

BACKGROUND OF THE INVENTION

In a paint booth, the general object is to apply as much of the paint as possible to the articles being painted and minimize overspray. However, there is always a certain amount of overspray even with electrostatic paint sprayers. Generally the overspray is collected by forcing air through the paint spray booth. This causes the overspray to be entrained in the stream of forced air.

The air is passed through some type of water collector, such as a water curtain, which traps particles of paint carried by the air. This prevents the paint particles from being discharged into the atmosphere. Unfortunately, once the paint particles are trapped in a body of water held in a collection basin or tank, they must be removed.

Even though the paint particles are suspended in water, they still tend to be tacky. If untreated, they will form as a sludge and attach to the walls and base of the holding tank. When sufficient amounts are built up, they must be cleaned. Cleaning the tank can be very expensive and time consuming.

To overcome this, the paint particles are treated with various compositions and agents to in effect detackify the particles preventing them from sticking together to form a sludge. This also prevents them from sticking to the walls of the holding tank. These compositions and mixtures are all generally added to the water used to trap and hold the paint particles.

As an example, Mauceri U.S. Pat. No. 4,067,806 describes a cationic terpolymer of dialkyldimethyl ammonium halide, N-vinyl-2-pyrolidone acrylamide and the salt of an amphoteric metal as a paint detackification product.

Forney U.S. Pat. No. 3,861,887 discloses a blend of polycationic water dispersible polymer and a water dispersible salt of an amphoteric metal such as zinc chloride, iron chloride, lanthinum chloride or aluminum chloride.

Leitz U.S. Pat. No. 4,629,572 discloses the use of condensation resins of aldehyde and nitrogeneous compounds such as urea, melamine, thiourea, quanidine, dicyanadiamide, substituted melamine and others in combination with clay. Many other patents disclose the use of clay itself or clay in combination with other polymers as a detackification agent for paint spray booths.

Any system that employs clay presents an inherent disadvantage since the clay itself significantly increases the amount of waste material that must be discarded. Since the paint material must be treated as a hazardous waste, it is expensive to dispose. Any system that employs clay significantly increases this cost.

Other patents which disclose various treatment compositions which rely on clay, multivalent metal compositions and polymers include Mizuno U.S. Pat. No. 4,656,059, Renner U.S. Pat. No. 3,716,483, Harpel U.S. Pat. No. 4,504,395, Sellet U.S. Pat. No. 3,498,913, Gabel U.S. Pat. No. 4,055,495, and Arnold U.S. Pat. No. 3,515,575.

Generally, in addition to waste problems, many of these polymeric compositions are ineffective and particularly are not effective over a wide range of paint compositions. Further, with various compositions, there is a significant cost due to the concentration of the polymer required.

SUMMARY OF THE INVENTION

The present invention is premised on the realization that a combination of a copolymer of a dicyanadiamide and formaldehyde along with a water soluble multivalent metal salt, particularly an aluminum salt, such as aluminum chlorohydrate is an effective paint detackification product for a wide variety of different paints.

The present invention is further premised on the realization that the dicyanadiamide formaldehyde copolymer in combination with aluminum chlorohydrate can be used at relatively low levels to detackify paint and without significantly increasing the weight of waste product produced thereby avoiding significant expense.

The present invention is further premised on the realization that dicyanadiamide formaldehyde copolymer in combination with aluminum chlorohydrate acts to effectively detackify oil based paints as well as water based paints at alkaline pHs. The present invention is in fact effective to detackify both types of paints at the same time in the same paint spray booth.

The objects and advantages of the present invention will be further appreciated in light of the following detailed description.

DETAILED DESCRIPTION

A paint detackification system for use in the present invention includes a carbamide polymer and multivalent metal salt. The polymer is the condensation product of dicyanadiamide (also referred to as cyanoquanidine) and formaldehyde. The formaldehyde amino condensation reaction is a well known reaction which is conducted under acidic conditions. Basically equimolar amounts of dicyanadiamide and formaldehyde are reacted to form this polymer.

For use in the present invention, the copolymer must be water dispersible and should be water soluble. Generally such polymers will have a molecular weight of 1000 to 200,000 and generally less than 100,000.

The presently preferred polymer is Surtech 6253 purchased from Surfactant Technologies, 328 West 11th Street, Riviera Beach, Fla. This is purchased as a 48-52% active solution in water having a specific gravity of 1.17-1.20. It generally has a pH of about 3.5-4.2.

The multivalent metal salt can be a salt of aluminum, iron, magnesium, calcium, nickel or zinc. Specific salts include calcium chloride, aluminum sulfate, aluminum chloride and aluminum chlorohydrate. The aluminum salts are most effective in the present system and aluminum chlorohydrate is most preferred due to its effectiveness and versatility.

Aluminum chlorohydrate is also referred to as aluminum hydroxychloride, aluminum chloride hydroxide and aluminum chlorohydroxide. The commercial product is sold as 50% solution containing 23-24% $Al_2O_3$ and 7.5 to 8.5% Cl.

In preparing the paint detackification composition of the present invention, the multivalent metal salt is added to the solution of dicyanadiamide formaldehyde copolymer. Generally the ratio of bivalent metal salt to copolymer will range from 22.5-1 to about 1-4 by weight.

The preferred embodiment of the present invention is a combination of aluminum chlorohydrate and dicyanadiamide formaldehyde copolymer. In order to form this, the aluminum chlorohydrate is added to the solution of dicyanadiamide formaldehyde copolymer.

Aluminum chlorohydrate can be purchased as a 50% solution in water from Courtney Industries among others. Generally the concentration of aluminum chlorohydrate in the solution of dicyanadiamide formaldehyde copolymer will be from about 5 to about 22.5% by weight (solids) and preferably 7.5% to 15%. Generally the dicyanadiamide formaldehyde copolymer will comprise 1-50% (actives by weight) of the solution and preferably 10%-20%.

This concentrated solution of polymer and multivalent metal salt is then added to the water system of the paint spray booth. There are many different types of paint spray booths and paint overspray collection systems. However, the particular system forms no part of the present invention.

The water in the overspray collection system is first adjusted to a pH of about 9 to about 10 with about 9 to about 9¼ being preferred. This is done using a suitable buffer such as soda ash or sodium silicate. Preferably, an aqueous solution of 4% sodium silicate and 12% soda ash is added to the water until a total alkalinity of up to 3000 ppm is achieved.

The solution of polymer and multivalent metal salt is then added to the water. On a weight basis, the concentration of polymer should be from about 95 to about 800 ppm with about 400 ppm being preferred. The concentration of multivalent metal salt should be from about 70 to about 600 with about 300 ppm preferred in the water system. Of course, the amount added will vary depending upon the concentration of the solution of polymer and metal salt along with the molecular weight of the polymer.

If a defoamer is needed, a petroleum based defoamer should be added as needed. One such petroleum based defoamer is Depress Plus sold by DuBois Chemicals. There are other comparable defoamers on the market which are equally suited for this application.

The overspray paint collected in the system and treated with the composition of the present invention can then be collected using various mechanical or chemical collection methods. For example, this can be removed from water using a flocculant such as a higher molecular weight polymer or simply can be physically collected depending on the particular paint which is the overspray and the available equipment. Suitable kick out polymer includes medium to high charge density hydrolyzed polyacrylamide polymers and acrylamide/acrylic acid copolymers such as Floculite 552 and Floculite 402 sold by DuBois Chemicals. These are well known in the industry and generally different polymers will be selected based on the paint being collected and the collection equipment.

The advantages of the present invention will be further appreciated in light of the following detailed example.

Example

To test the detackifier of the present invention, a detackifying composition including 10% on an active basis of dicyanadiamide formaldehyde copolymer and 7.5% aluminum chlorohydrate was tested in a six foot, eight inch long Hydrospin TM MK III spraybooth with two dynatubes. The sludge removal system was a size 600 Hydropac TM. The capacity of the system is 1200 gallons with a water flow rate to the booth of 200 gallons per minute. The waterflow rate to the Hydropac TM is 60 gallons per minute. A solution of 4% sodium silicate and 12% soda ash was added until the alkalinity of the system was 3000 ppm total M. The solution of dicyanadiamide formaldehyde aluminum chlorohydrate was added until the concentration of the polymer was about 400 parts per million and the concentration of the aluminum chlorohydrate was about 300 parts per million. During the test, additional detackifier was added to maintain this concentration.

Eight gallons of a water based PPG brand base clearcoat was sprayed using a Binks Brand 61 air atomized spray gun at 70 psi air pressure and 8 gallons of PPG Brand oil based base coat was sprayed over a period of two hours. During the course of this, 30.24 liters of clear coat were sprayed and 30.24 liters of base coat were sprayed.

Four coupons were positioned in the paint booth to detect stickiness due to the clear coat and due to the base coat. The coupons collected 103.3 milligrams of paint combined. Any number lower than a 120 milligrams is considered to be good. The solids content of the collected sludge was 10.9%. The paint collection efficiency was 96.5 which is considered good. And the average suspended solids was 176.6. The chemical to paint solids ratio was 0.23:1.

As shown by the example, this detackification composition simultaneously detackifies aqueous and oil based paints at alkaline pHs. This is truly remarkable in light of the fact that generally water based paints are detackified using acid conditions frequently with pHs as low as 4.

The present invention permits these to be removed at alkaline pHs which are less corrosive. Further, there is extreme versatility provided since the same conditions can be used for both oil and water based paints.

Thus the present invention is useful in collecting a variety of different paint compositions. Its use concentration level is significantly lower than other polymeric detackifiers. This versatility and low use concentration is particularly advantageous in today's environment. Further, since there is no clay in this formulation, the amount of waste produced is relatively low. This significantly reduces the cost of using this product.

The preceding has been a description of the present invention along with the preferred method of practicing the present invention. However, the invention should only be defined by the appended claims wherein we claim:

1. A method of detackifying paint overspray contained in water in a paint booth comprising adjusting the pH of said water to about 7 to about 10, adding a paint detackification composition consisting essentially of a polymer and an aluminum salt selected from the group consisting of aluminum sulfate, aluminum chloride and aluminum chlorohydrate in an amount effective to detackify overspray in said water wherein said polymer is the condensation product of dicyanadiamide and formaldehyde wherein the ratio of polymer to aluminum salt is from about 22.5:1 to about 1:4; and wherein the concentration of polymer added to said water is from about 95 to about 800 ppm.

2. The method claimed in claim 1 wherein said aluminum metal salt is aluminum chlorohydrate.

3. The method claimed in claim 2 wherein said polymer has a molecular weight of from about 1000 to about 200,000.

4. The method claimed in claim 2 further comprising adding up to about 3,000 ppm as M of total alkalinity to said water.

5. The method claimed in claim 2 wherein said paint comprises a water based paint.

6. The method claimed in claim 2 wherein said paint comprises an oil based paint.

7. The method claimed in claim 2 wherein said paint comprises a combination of water based paint and oil based paint.

8. A method of detackifying paint overspary contained in water in a paint spray booth system comprising adding to said water a paint delackification composition consisting essentially of from about 95 to 800 parts per million of a dicyanadiamide formaldehyde copolymer having a molecular weight of from about 1,000 to about 200,000 and aluminum chlorohydrate wherein the ratio of said copolymer to said aluminum chlorohydrate is from about 22.5:1 to about 1:4 and adjusting the pH of said water to about 9 to about 10 and collecting detackified paint and removing said detackified paint from said water.

9. A method of detackifying paint overspray contained in water in a paint spray booth system consisting essentially of
    (a) adding to said water a paint detackification composition consisting essentially of a dicyanadiamide formaldehyde copolymer having a molecular weight from about 1,000 to about 200,000 and a water soluble aluminum metal salt wherein the ratio of said copolymer to said aluminum metal salt is from about 22.5:1 to about 1:4;
    (b) adjusting the pH of said water to about 7 to about 10 and collecting detackified paint; and
    (c) removing said detackified paint from said water.

* * * * *